United States Patent Office 3,610,097
Patented Oct. 5, 1971

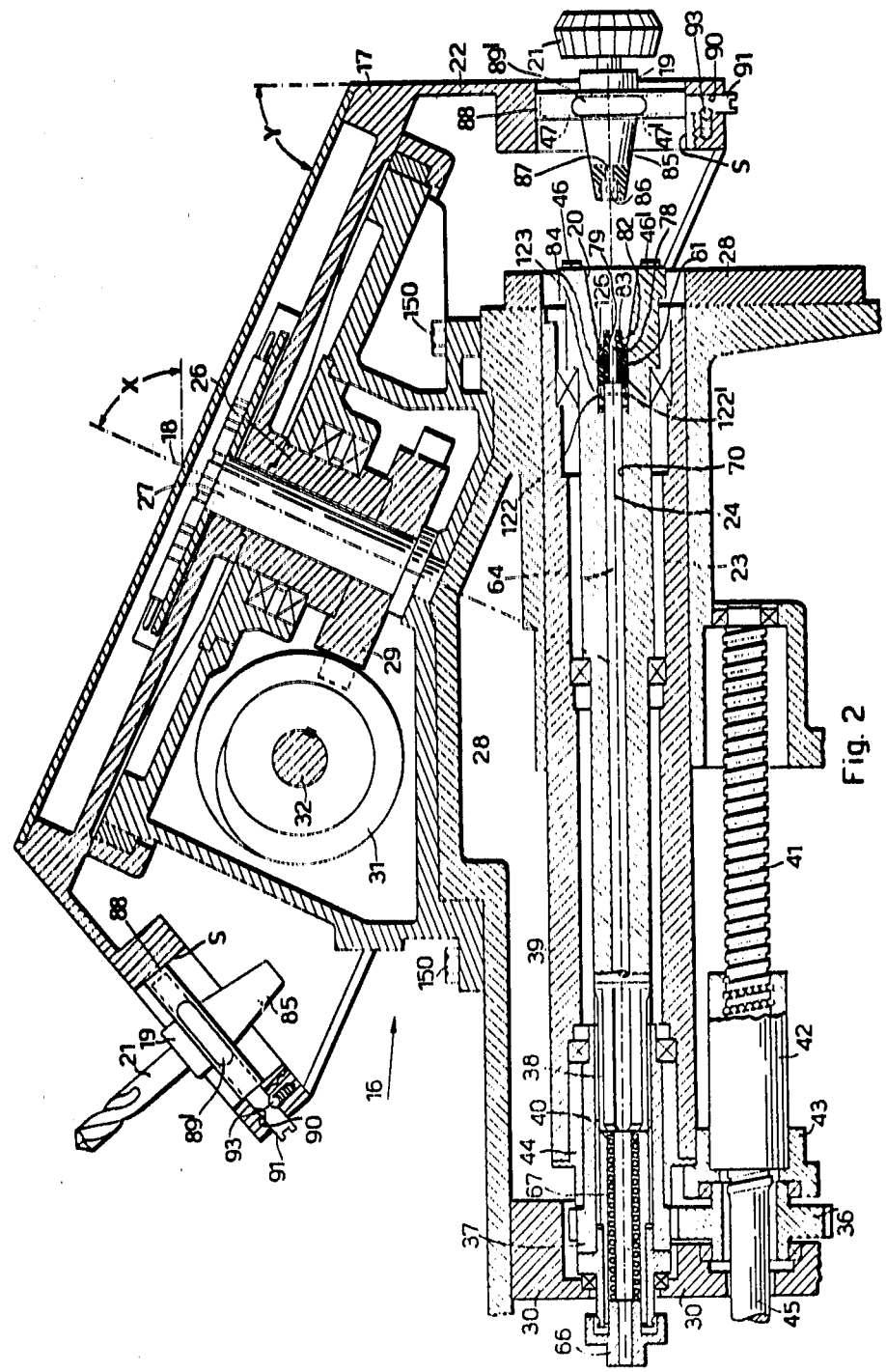

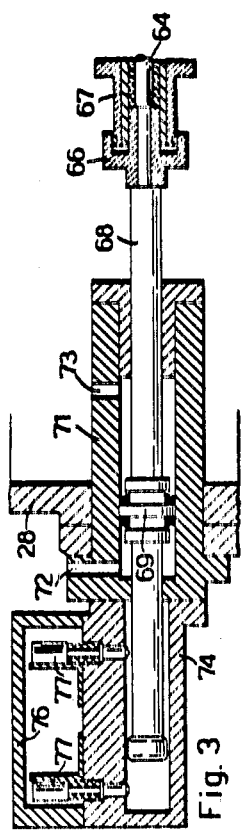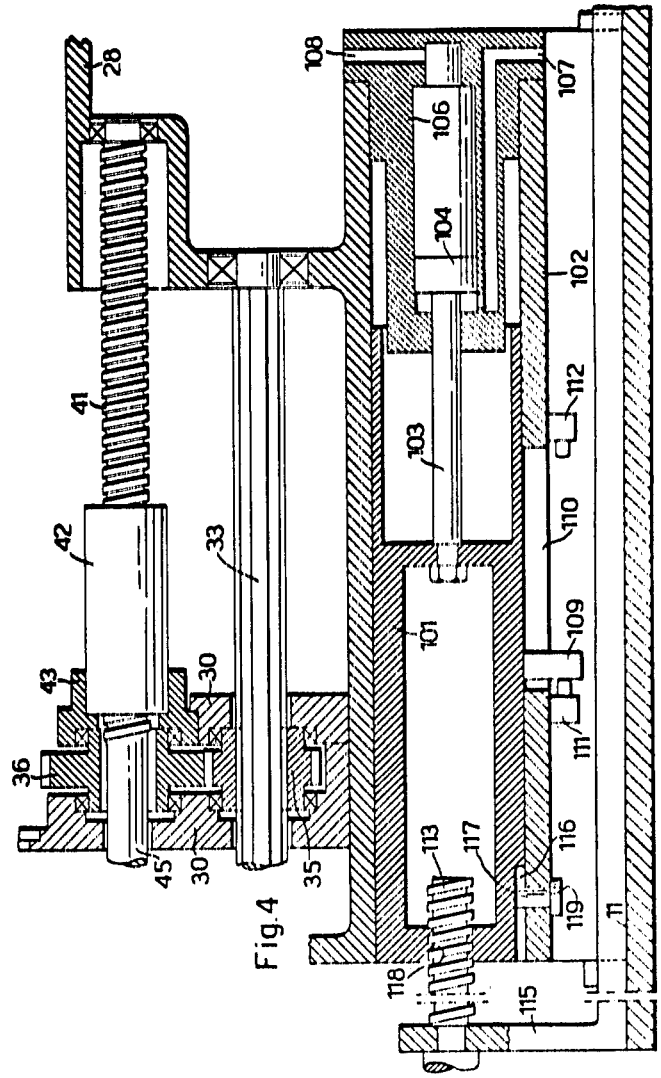

3,610,097
TOOL FEEDING DEVICE FOR MACHINE TOOLS
Giorgio Ollearo, Via Cascinette 35/R, and Elio Pagella, Via Monteferrando 12, both of 10015 Ivrea, Turin, Italy
Original application July 29, 1968, Ser. No. 748,402. Divided and this application June 25, 1970, Ser. No. 49,769
Claims priority, application Italy, July 29, 1967, 52,600/67
Int. Cl. B23c 1/02; B23b 7/04
U.S. Cl. 90—14                                    3 Claims

ABSTRACT OF THE DISCLOSURE

A machine tool arrangement having a device for controlling the chuck thereof, comprising a base, a headstock mounted thereon, and a sleeve axially slideable within the headstock, the chuck being rotatable within the sleeve. The chuck is arranged to be rotatable by a shaft disposed parallel and non-coaxially thereto by a train of gear wheels displaceable together with the sleeve, relative to the shaft. The sleeve is arranged to be shifted axially by means of a mechanism arranged parallel and non-coaxially with the shaft to apply rotational force to the chuck in a manner such that the torsional deformation thereof remains constant throughout the entire chuck stroke.

CROSS REFERENCE TO RELATED APPLICATIONS

Applicants claim priority from corresponding Italian patent application Ser. No. 52,600–A/67, filed July 29, 1967.

This application is a divisional application of application Ser. No. 748,402, filed July 29, 1968.

BACKGROUND OF THE INVENTION

Field of the invention

The invention relates to a machine tool having a device for controlling the chuck thereof to maintain the torsional deformation constant throughout the entire chuck stroke. In particular, means are disclosed which are associated with the chuck to provide displacement thereof in such manner as to maintain said deformation constant.

Description of the prior art

The prior art discloses machine tool arrangements wherein the chuck is controlled by a motor through a shaft which is coaxial with the chuck and connected thereto at that end remote from the end at which the selected tool is coupled to the chuck. Since the chuck has to be moved in an axial direction to bring the tool into contact with the workpiece and effect the required operation thereon, the distance between the point of application of the force that actuates the chuck and the point at which the tool acts on the workpiece varies continuously. This type of control is troublesome and causes undesirable vibrations of the machine tool arrangement.

SUMMARY OF THE INVENTION

These and other defects of prior art machine tool arrangements are solved by the present invention wherein the point of application of rotational force on the chuck shifts together with movement of the chuck, whereby the torsional deformation remains constant throughout the entire chuck stroke. According to the invention a machine tool arrangement is provided comprising a base, a headstock mounted on the base, a sleeve axially slideable in the headstock, and a chuck rotatable in the sleeve. The chuck is arranged to be rotated by a shaft positioned parallel to and non-coaxially with the chuck by means of a train of gear wheels slideable relative to the shaft and sleeve.

The sleeve is arranged to be shifted in an axial direction by means of a screw and nut asesmbly in which the screw is arranged parallel and non-coaxially with the shaft, while the nut is integral with the sleeve.

The machine tool arrangement may be adapted for tool changing and comprises a magazine mounted on the headstock and adapted to house a series of tools. The magazine can be shifted in order to align selected tools with the chuck. Since the tools may be of substantially different lengths, it is desirable that the headstock be movable in an axial direction relative to the base by shifting means which are operable rapidly and independently of the screw and nut assembly, in order to obtain a constant chuck stroke distance. In the event tools having the same length are used, the headstock need not be shifted each time by the constant stroke distance.

BRIEF DESCRIPTION OF THE DRAWINGS

FIG. 2 is a first partial longitudinal sectional view of the machine of FIG. 1 taken along section lines II—II of FIG. 1;

FIG. 3 is a section partial longitudinal sectional view of the machine of FIG. 1 also taken along section lines II—II; and FIG. 4 is a third partial longitudinal sectional view of the machine of FIG. 1, also taken along section lines II—II.

DETAILED DESCRIPTION OF THE INVENTION

Figure 1:
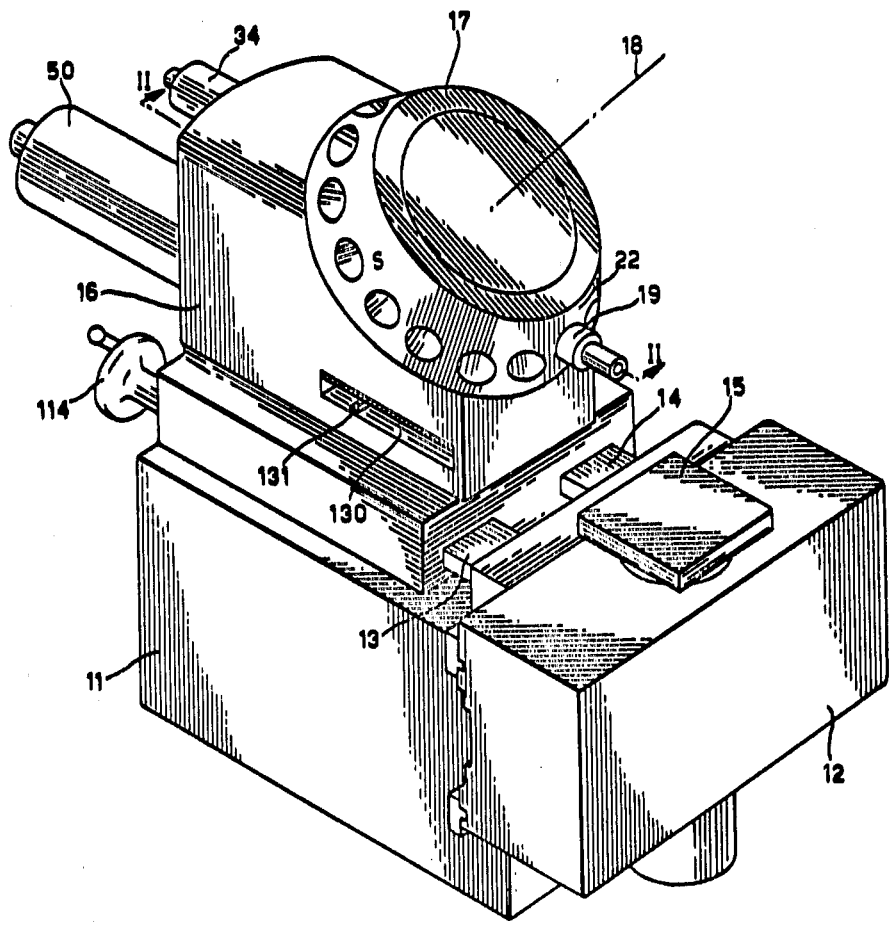
FIG. 1 is a left front perspective view of a machine tool arrangement that may be used in conjunction with the chuck control device disclosed according to the invention.

Referring to FIG. 1, the machine comprises base 11 mounted on carriage 12 which is movable in the transverse direction, and workpiece table 15 which is rotatable and vertically adjustable. The movements of carriage 12 and table 15 may be controlled by a conventional control system having a program recorded on punched or magnetic tape, for example.

Prismatic guides 13 and 14 upon which headstock 16 is free to run are affixed to base 11. Headstock 16 carries a tool-magazine secured thereto by screws 150 (FIG. 2). The tool-magazine comprises truncated cone-shaped drum 17 which is revolvable about its axis 18. Drum 17 defines a plurality of equal angularly spaced seats S to hold a series of tool-carriers 19 each of which carries a particular associated tool 21 projecting radially from lateral surface 22 of the drum.

As shown in FIG. 2, headstock 16 also comprises horizontal chuck 23 rotatable about its longitudinal axis 24. Axis 18 of drum 17 is inclined towards axis 24 of chuck 23 at an angle X which is equal to the angle Y formed by the generatrix of the truncated cone-shaped drum 17 with either of its bases. Therefore when the drum turns, it aligns the various tools with the axis of chuck 23, according to a predetermined sequence determined by the selected program.

Drum 17 is integral with sleeve 26, the latter being rotatable on shaft 27 which is fixed to frame 28 of headstock 16. Drum 17 is therefore rotatable about frame 28. Sleeve 26 is also integral with worm wheel 29 that engages with worm 31 mounted by rotatable shaft 32 on frame 28. The gear ratio between worm 31 and wheel 29 is such that for each revolution of shaft 32, wheel 29 causes drum 17 to turn an amount equal to the angular distance between two adjacent tools. As best shown in FIG. 1 the tool seats S are equal angularly spaced from drum 17. Accordingly, the gear ratio between worm 31 and wheel 29 is determined by the number of tool seats, for example, if there are 12 tool seats one revolution of worm 31 must result in a 1/12 revolution of drum 17 the ratio would then be 12 to one in the example chosen. The drum thereby advances by one tool interval for each revolution of shaft 32. Rotation of shaft 32 for the purposes of tool selection is effected in the manner described in U.S. patent application Ser. No. 576,459, filed Aug. 31, 1966 by Giorgio Ollearo, now Pat. No. 3,473,419.

The control mechanism for rotation of chuck 23 comprises a splined shaft 33 (FIG. 4) engaged by gear wheel 25. The latter is actuated through a conventional change-speed gear (not shown) by electric motor 34 mounted on headstock 16. Interposed between shaft 33 and chuck 23 is a train of gears 35, 36, 37 (FIGS. 2 and 4). Gear 35 is internally splined and slidable on shaft 33, and gear 37 has an internally splined cylindrical extension 40 which engages splined portion 38 of chuck 23. Gears 35 and 36 are journalled in support 30 which is suitably guided on frame 28 for displacement parallel to shaft 33. Chuck 23 is rotatably mounted by means of bearings in slide 39 which is mounted on support 30.

Referring to FIG. 2, the control transmission for the advancement and return of slide 39 comprises screw 41 and recirculating ball nut 42, operative through collar 43 and sleeve 44 on slide 39. Screw 41 is operated through shaft 45 by motor 50 (FIG. 1) mounted on headstock 16. Gear 36 is journalled loose on shaft 45. Cylindrical extension 40 of gear 37 is rotatably received within sleeve 44.

Chuck 23 has an axial bore 70 in which rod 64 is slidable. The rear end of rod 64 is integral with cap 66. Piston 69 (FIG. 3) is slidable in hydraulic cylinder 71 which is integral with housing 28, and has ports 72 and 73 for the admittance and release of fluid. It is provided with piston rod 68 which normally acts on cap 66 under the force of fluid admitted by port 72 to hold the cap resiliently in an advanced position against the force of compression of spring 67 positioned between collar 126 of rod 64 and splined portion 38 of chuck 23. Pistons rod 68 of piston 69 is extended on the side remote from head 66 and slides in cylinder 74. Casing 76, containing limit switches 77 and 77' which are engaged by the end of rod 68 to arrest the stroke of piston 69, is affixed to cylinder 74.

As shown in FIG. 2, each tool carrier 19 comprises a conical tail 85 for selective receipt by conical recess 20 which is formed at the end of chuck 23. In the area of recess 20, rod 64 has a terminal portion 78 of reduced diameter defining radial recesses 79 on its external surface. Terminal portion 78 is contained in a hollow bushing 81, the wall of which forms seat 82 for receipt of corresponding small balls 83. Bushing 81 has recesses 122 and 122' in which pin 123, affixed to shaft 64, is positioned. Compression spring 84 located between a shoulder of bushing 81 and rod 64 normally holds the bushing against ring 126 which is screwed to chuck 23. Balls 83 are thereby positioned in seats 82 (FIG. 2). The balls are operative to emerge partially from seats 82 of bushing 81 and enter corresponding recesses 86 formed in the internal surface of bore 87 of tail 85 of the tool carrier 19 selected for operation on the workpiece, as shown in FIG. 2.

Each tool carrier 19 also has a collar 88 locked by bars 91 and 91' positioned diametrically opposed each other, as shown in FIG. 2. The bars are held in position on drum 17 by spring loaded detent balls 93, which engage with one of a pair of notches 90 formed in each bar. Details of these features are shown in application Ser. No. 748,535 filed July 29, 1968, now Pat. No. 3,551,974 by Guiseppe Fantoni, assigned to the assignee of the instant invention.

Headstock 16 is provided at its lower part with cylindrical guide 102 (FIG. 4) fixed to housing 28. Cylinder 101 is fixed to piston rod 103 of piston 104 which is slideable within double-acting hydraulic cylinder 106, the latter being integral with guide 102. Cylinder 101 is slideable within guide 102. Fluid under pressure can enter cylinder 106 by ports 107 and 108.

Cylinder 101 carries on its lateral surface extension 109 which extends radially through slot 110 in guide 102 and is adapted to engage, as cylinder 106 and guide 102 slide axially, with end-of-strove limit switches 111 and 112 which are fixed externally to guide 102. Screw 113 rotatable on bracket 115 on base 11 is controlled by handwheel 114 (FIG. 1) and is screwed into threaded axial hole 118 on cylinder 101. The latter defines on its lateral surface longitudinal groove 116. Key 117 fixed in hole 119 in guide 102 engages groove 116 to prevent relative rotation therebetween. Key 117 is centrally located in groove 116 so that cylinder 101 is slideable in both directions.

The operation of the machine is as follows:

The front end of chuck 23 has radial keys 46 and 46' that fit into corresponding slots 47 and 47', respectively, which are provided on each tool-holder 19 for the purpose of coupling the latter to chuck 23. To insure accurate and reliable keying of the radial keys into their corresponding slots, a positioning unit is operatively associated with chuck 23. This may be of the type disclosed in the copending application Ser. No. 748,535 filed July 29, 1968 by Guiseppe Fantoni entitled Tool Change Device for Machine Tool assigned to the same assignee as this invention.

Drum 17 is rotated to select the desired tool by rotating shaft 32, worm 31, worm wheel 29, sleeve 26 and hence the drum until the required tool is in alignment with the chuck 23. The selection of the new tool is made by control criteria for the machine that may be programmed on perforated or magnetic tape as conventionally known as described above. In order to couple the new tool to chuck 23, it is necessary for the latter to be appropriately orientated in such manner that keys 46 and 46' of chuck 23 may enter recesses 47 and 47', respectively in the selected tool carrier 19.

The new tool is then coupled to chuck 23 by rotating shaft 45 and hence screw 41, the corresponding nut 42 of which shifts sleeve 30 forwardly together with gear wheels 36 and 37 until chuck 23 is brought over the new tool carrier 19. Under the control of fluid admitted through port 72, piston 69 follows chuck 23 and holds rod 64 in the position, relative to the chuck, shown in FIG. 4.

Fluid then enters cylinder 71 (FIG. 3) through port 73 and causes piston 69 to perform a complete rearward stroke, thereby disengaging it from head 66 of rod 64 which is then forced rearwardly by spring 67. Rod 64, when retracting, shifts pin 123 in recesses 122 and 122', whereby portion 78 withdraws recesses 79 from balls 83. The balls are thus forced radially outwards and are received by recesses 86 in bore 87. The selected tool carrier 19 thereby becomes locked to chuck 23.

Tool carrier 19 is then unlocked from drum 17 as, for example, in the manner described in the patent application Ser. No. 748,535 filed July 29, 1968 by Guiseppe Fantoni entitled Tool Clamping Device for Tool Storage Magazine of Machine Tool, assigned to the same assignee as this application, referenced hereinabove.

Motor 50 is then actuated and causes splined shaft 33 to rotate by gear wheels 35, 36, 37. This causes chuck 23 to rotate together with tool carrier 19. Simultaneously motor 34 again rotates screw 41 at a velocity corresponding to the required speed of advance of the tool to effect the required operation. Chuck 23 is axially moved through the seat S to drive the engaged tool for operation on the workpiece.

Since the advance of chuck 23 is followed by sleeve 39 and gear wheels 35, 36, 37, splined shaft 33 rotates the chuck at a point that remains in a constant position relative to the chuck, thereby avoiding the torsional deformations that would occur if shaft 33 were axially aligned with the chuck. When the operation on the workpiece is finished, the rotation of motor 34 is reversed in such manner as to withdraw chuck 23 rearwardly so that tool carrier 19 can again be locked to drum 17.

Thereupon fluid is again admitted to cylinder 71 by port 72 (FIG. 3) whereby piston 69 is shifted forwardly by its maximum stroke. Piston rod 68 then acts on head 66 of Rod 64, which is again positioned in the forward position together with chuck 23. Rod 64 is thus positioned forwardly within chuck 23 by a small amount relative to bushing 81 (FIG. 2). Pin 123 on rod 64 then pushes bushing 81 until it abuts against ring 126. In this movement, portion 78 of rod 64 brings recesses 79 back into registration with balls 83 and the latter can then move radially inwardly.

By rotating screw 41 again, sleeve 39 is returned rearwardly whereby chuck 23 and rod 64 are separated from tool carrier 19. During this movement, head 66 of rod 64 returns piston rod 68 partially backwards whereby the machine returns into the initial position described above and is ready for the selection of a new tool.

With the object of avoiding interference between the tools and the workpiece during rotation of drum 17 in the event that drum 17 carries tools of appreciably different lengths, head stock 16 and drum 17 together are shifted automatically by a definite fixed movement on guides 13 and 14 (FIG. 1) as follows. Fluid is admitted into cylinder 105 (FIG. 4) by port 107. The cylinder is thereby moved rearwardly, together with guide 102 and housing 28, whereby headstock 16 withdraws drum 17 from the workpiece.

When drum 17 attains the required angular position, fluid enters cylinder 106 by port 108 whereby the cylinder and hence headstock 16 return to the position shown.

By actuation of handwheel 114 (FIG. 1), the position of cylinder 101 relative to housing 28 can be regulated through screw 113, while key 117 and groove 116 permit sliding of guide 102 relative to cylinder 101 of headstock 16.

Limit switches 111 and 112 are actuated by extension 109 and thereby relay information relative to the movement of cylinder 101 to the central unit.

Headstock 16, as shown in FIG. 1, is provided with an opening 130 having a graduated scale cooperative with pointer 131 which is connected to sleeve 39, for the purpose of indicating to the operator at any selected time the longitudinal position of chuck 23.

We claim:

1. Apparatus providing for rotational and axial movements of a chuck in a working head of a machine tool having a machine base, a workpiece holding table mounted on said base, a frame for said working head supported by said base, said working head having a sleeve slidable on said frame and said chuck rotatably mounted within said sleeve; an improvement comprising: said chuck being supported within said sleeve for movement therewith in the axial direction, a splined shaft rotatably mounted on said frame parallel and adjacent to said chuck for driving the chuck, a plate secured to said sleeve and shiftable on said frame, a screw and nut assembly arranged parallel to said shaft and substantially intermediate said chuck and said shaft, said screw and nut assembly being connected to said plate for axially advancing said sleeve and chuck together and a train of gears including a first toothed wheel secured to said chuck for rotating same, an internally splined second toothed wheel rotatably mounted on said plate and slidable axially on and rotatable with said shaft, and an idle toothed wheel meshing with said first and second wheels and rotatably mounted on said plate coaxially with said screw and nut assembly, whereby said second and idle gears are moved along with said sleeve to keep the rotational force on said chuck at the same location during the advancement thereof.

2. Apparatus according to claim 1, further including; an additional mechanism for shifting said working head by a constant stroke to advance and retract said working head with respect to said workpiece table independently of the operation of said screw and nut assembly.

3. Apparatus according to claim 2 wheren said additional mechanism comprises a hydraulically operated actuator having a cylinder and a piston, the moving part of said actuator being secured to a guiding portion of said frame, said guiding portion being telescopically slidable on a member adjustably fixed on said base, the stationary part of said actuator being secured to said member.

References Cited

UNITED STATES PATENTS

| 3,455,207 | 7/1969 | Meinke | 90—14 |
| 3,473,419 | 10/1969 | Ollearo | 77—25 |
| 3,548,711 | 12/1970 | Baldwin | 90—14 |

FOREIGN PATENTS

| 613,325 | 12/1960 | Italy | 90—14 |

GIL WEIDENFELD, Primary Examiner

U.S. Cl. X.R.

29—40

UNITED STATES PATENT OFFICE
CERTIFICATE OF CORRECTION

Patent No. 3,610,097    Dated October 5, 1971

Inventor(s) Giorgio Ollearo et al.

It is certified that error appears in the above-identified patent and that said Letters Patent are hereby corrected as shown below:

In the heading to the printed specification, after line 5, insert -- assignors to Ing. C. Olivetti & C., S.p.A., Ivrea (Torino) Italy, a corporation of Italy.--.

Signed and sealed this 27th day of June 1972.

(SEAL)
Attest:

EDWARD M. FLETCHER, JR.
Attesting Officer

ROBERT GOTTSCHALK
Commissioner of Patents